US011919053B2

(12) United States Patent
Hall

(10) Patent No.: US 11,919,053 B2
(45) Date of Patent: Mar. 5, 2024

(54) SYSTEMS AND METHODS TO CLEAN A CONTINUOUS SUBSTRATE

(71) Applicant: Illinois Tool Works Inc., Glenview, IL (US)

(72) Inventor: Gregory T. Hall, Winston-Salem, NC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/983,093

(22) Filed: Nov. 8, 2022

(65) Prior Publication Data

US 2023/0053438 A1 Feb. 23, 2023

Related U.S. Application Data

(62) Division of application No. 16/943,506, filed on Jul. 30, 2020, now Pat. No. 11,534,804.
(Continued)

(51) Int. Cl.
*B08B 13/00* (2006.01)
*B08B 3/02* (2006.01)
(Continued)

(52) U.S. Cl.
CPC ................ *B08B 7/04* (2013.01); *B08B 3/022* (2013.01); *B08B 3/041* (2013.01); *B08B 3/08* (2013.01); *B08B 3/102* (2013.01); *B08B 3/123* (2013.01)

(58) Field of Classification Search
None
See application file for complete search history.

(56) References Cited

U.S. PATENT DOCUMENTS 3,688,527 A 9/1972 Stanley
5,943,747 A 8/1999 Kurt
(Continued)

FOREIGN PATENT DOCUMENTS

CN 2351461 12/1999
CN 1425820 6/2003
(Continued)

OTHER PUBLICATIONS

Int'l Search Report and Written Opinion Appln No. PCT/US2020/044450 dated Feb. 2, 2021, 19 pages.
(Continued)

*Primary Examiner* — Eric W Golightly
(74) *Attorney, Agent, or Firm* — McAndrews, Held & Malloy, Ltd.

(57) ABSTRACT

An example system to clean a continuous substrate includes: one or more high pressure nozzles configured to spray a high pressure, low flow spray of a first cleaning fluid at the continuous substrate to remove particulate matter from the continuous substrate; an agitation bath and a plurality of rollers configured to transport the continuous substrate from a first volume having the high pressure, low volume spray, to a second volume having the agitation bath; an agitator in the agitation bath, comprising at least one of a megasonic transducer or an ultrasonic transducer, and configured to direct energy at the continuous substrate; and a vacuum roller configured to vacuum moisture from the continuous substrate during transporting of the continuous substrate from the first volume to the second volume; a dryer configured to dry the continuous substrate.

18 Claims, 7 Drawing Sheets

Related U.S. Application Data

(60) Provisional application No. 62/881,317, filed on Jul. 31, 2019.

(51) Int. Cl.

| | |
|---|---|
| ***B08B 3/04*** | (2006.01) |
| ***B08B 3/08*** | (2006.01) |
| ***B08B 3/10*** | (2006.01) |
| ***B08B 3/12*** | (2006.01) |
| ***B08B 7/04*** | (2006.01) |

(56) References Cited

U.S. PATENT DOCUMENTS

| | | | | |
|---|---|---|---|---|
| 6,273,790 | B1 * | 8/2001 | Neese | B24C 3/12 451/39 |
| 7,201,777 | B2 | 4/2007 | Booker | |
| 8,956,466 | B2 | 2/2015 | Blaiss | |
| 2009/0178695 | A1 | 7/2009 | Becker | |
| 2012/0318297 | A1 | 12/2012 | Cooper | |
| 2016/0338567 | A1 | 11/2016 | Kong | |

FOREIGN PATENT DOCUMENTS

| | | | | |
|---|---|---|---|---|
| CN | 101016681 | | 8/2007 | |
| CN | 203565403 | | 4/2014 | |
| CN | 109594255 | | 4/2019 | |
| DE | 9317374 | | 2/1994 | |
| EP | 2739777 | A1 * | 6/2014 | A47L 13/17 |
| GB | 1356162 | | 6/1974 | |
| GB | 1485782 | | 9/1977 | |
| GB | 2272227 | | 5/1994 | |
| JP | S6366366 | | 3/1988 | |
| JP | H08134770 | | 5/1996 | |
| WO | 9221451 | | 12/1992 | |
| WO | 2008120073 | | 10/2008 | |

OTHER PUBLICATIONS

Partial Search Report and Written Opinion Appln No. PCT/US2020/044450 dated Nov. 26, 2020, 9 pages.

European Request for Examination Appln No. 20768729.4 dated Dec. 22, 2023. 4 pages.

* cited by examiner

SYSTEMS AND METHODS TO CLEAN A CONTINUOUS SUBSTRATE

RELATED APPLICATIONS

The present application is a divisional application of U.S. patent application Ser. No. 16/943,506, filed Jul. 30, 2020, and issued as U.S. Pat. No. 11,534,804 on Dec. 27, 2022, entitled "SYSTEMS AND METHODS TO CLEAN A CONTINUOUS SUBSTRATE," and claims the benefit of U.S. Provisional Patent Application Ser. No. 62/881,317, filed Jul. 31, 2019, entitled "SYSTEMS AND METHODS TO CLEAN A CONTINUOUS SUBSTRATE." The entireties of U.S. patent application Ser. No. 16/943,506 and U.S. Provisional Patent Application Ser. No. 62/881,317 are expressly incorporated herein by reference.

BACKGROUND

This disclosure relates generally to production of clean textiles and, more particularly, to systems and methods to clean a continuous substrate.

Conventional systems and methods to clean substrates to levels appropriate for clean-room applications have limited throughput and/or limited ability to remove particulate matter from the substrate. For example, conventional systems and methods

SUMMARY

Systems and methods to clean a continuous substrate are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1A:
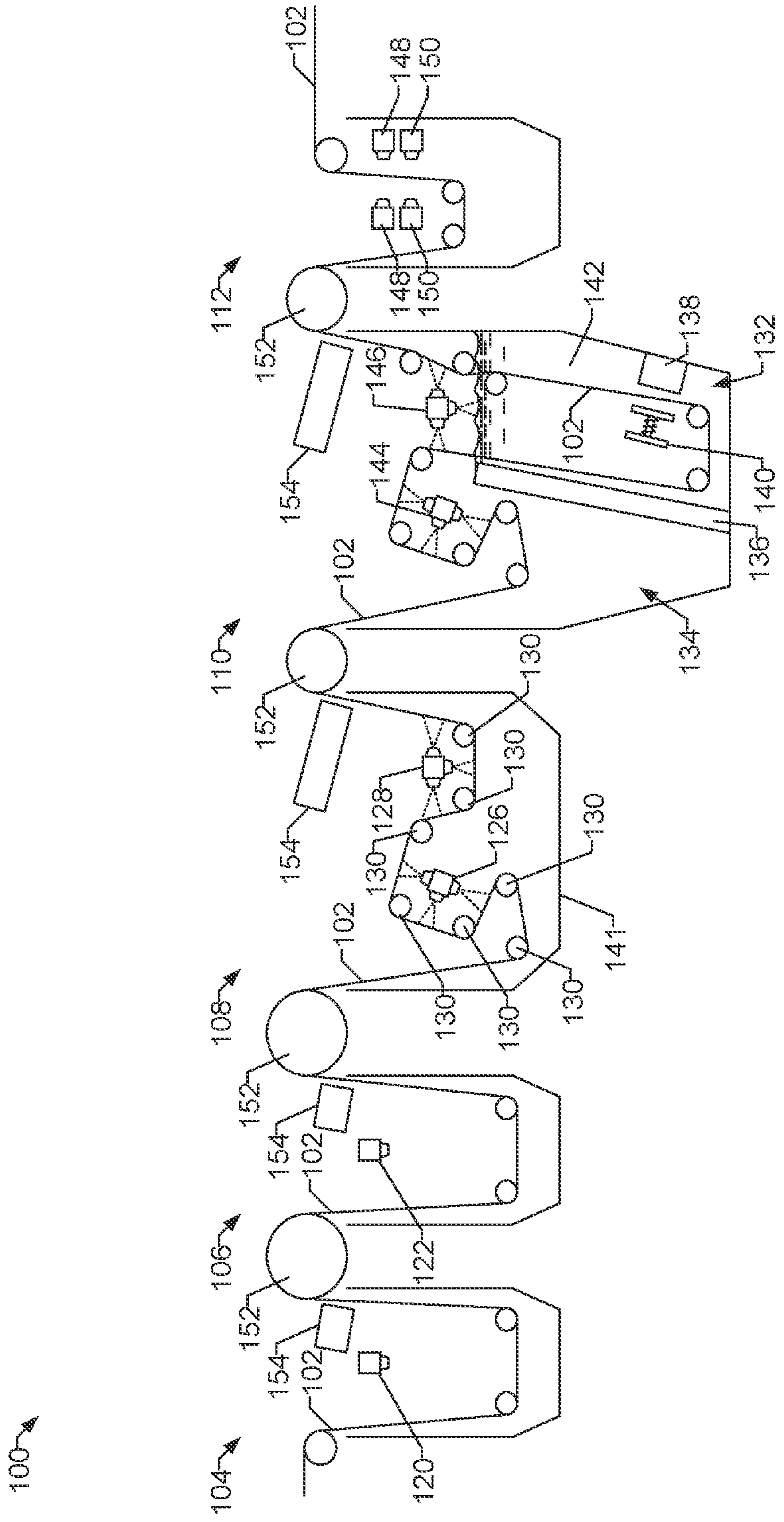
FIGS. 1A and 1B are a schematic diagram of an example system to clean a continuous substrate, in accordance with aspects of this disclosure.

Clean room applications typically benefit from cleaning using sorptive substrates, such as wiping of surfaces using wipers. To reduce the likelihood of contamination of sensitive products or equipment, the sorptive substrates are typically produced in a manner that particulate matter and/or ions are present on the substrate in less than threshold amounts.

Conventional techniques to clean continuous substrates, from which the wipers may be cut and packaged, may provide limited throughput (e.g., less than a threshold quantity of substrate cleaned, output, and/or packaged) and/or limited cleanliness (e.g., more than a threshold count of particulates).

Disclosed example methods to clean a continuous substrate involve: applying a high pressure, low flow spray of a first cleaning fluid at the continuous substrate from one or more nozzles to remove particulate matter from the continuous substrate; an agitator, including at least one of a megasonic transducer or an ultrasonic transducer, and configured to direct energy at the continuous substrate; and drying the continuous substrate.

Disclosed example systems to clean a continuous substrate include: one or more high pressure nozzles configured to spray a high pressure, low flow spray of a first cleaning fluid at the continuous substrate to remove particulate matter from the continuous substrate; an agitator, comprising at least one of a megasonic transducer or an ultrasonic transducer, and configured to direct energy at the continuous substrate; and a dryer configured to dry the continuous substrate.

Some example systems further include an agitator configured to wash the continuous substrate in an agitation bath.

Some example systems and methods further include using a reflector plate positioned on an opposite side of the continuous substrate from the agitator and configured to reflect energy from the agitator toward the continuous substrate.

In some example systems and methods, the applying of the high pressure, low flow spray involves spraying a first side of the continuous substrate with the high pressure, low flow spray via one or more first nozzles, and spraying a second side of the continuous substrate with the high pressure, low flow spray via one or more second nozzles. In some examples, the applying of the high pressure, low flow spray involves displacing portions of the continuous substrate at multiple locations in the transverse direction of the continuous substrate, to create a wave shape for directing the sprayed first cleaning fluid away from the continuous substrate.

In some examples, the high pressure, low flow spray displaces the continuous substrate at different transverse locations at different locations along the length of the continuous substrate. Some example systems and methods further involve routing the continuous substrate around a roller between the different locations along the length of the continuous substrate.

In some examples, the continuous substrate is between 6 inches and 12 inches in width. In some examples, the washing of the continuous substrate involves transporting the continuous substrate into the agitation bath, adjacent the one or more agitators, and out of the agitation bath. Some example systems and methods further involve cycling fluid in the agitation bath via adding the first cleaning fluid to the chamber and permitting the first cleaning fluid to flow out of the agitation bath over a weir wall to a drain. In some examples, cycling the first cleaning fluid involves conducting particulates toward the drain. Some example systems and methods further involve spraying the first cleaning fluid into the agitation bath via one or more spray nozzles to create surface turbulence in the agitation bath.

In some example systems and methods, the continuous substrate is not submerged during the applying of the high pressure, low flow spray. Some example systems and methods further involve rinsing the continuous substrate after applying the high pressure, low flow spray. Some example systems and methods further involve transporting the continuous substrate from a first volume having the high pressure, low volume spray, to a second volume having the agitation bath. Some example systems and methods further involve vacuuming moisture from the continuous substrate during transporting of the continuous substrate from the first volume to the second volume.

Some example systems and methods involve applying at least one of a hot water rinse or a cold water rinse to the continuous substrate prior to the high pressure, low flow spray. Some example systems and methods further involve rinsing the continuous substrate following the agitation bath. Some example systems and methods further involve rinsing the continuous substrate with a spray of a second cleaning fluid. In some examples, at least one of the first cleaning fluid or the second cleaning fluid includes a surfactant. In some examples, the first cleaning fluid and the second cleaning fluid are the same. In some example systems and methods, the first cleaning fluid includes deionized water. In some examples, the drying involves applying warmed and filtered air to the continuous substrate. Some examples further involve washing the continuous substrate in an agitation bath using one or more agitators.

As used herein, the term "high pressure, low flow spray" refers to a fluid spray that has a per-nozzle pressure of at least 40 pounds per square inch (PSI), and a per-nozzle flow rate of at least 0.15 gallons per minute (gpm) of fluid. In some example systems and methods, the high pressure, low flow spray involves a flow between 0.15 gallons per minute (gpm) and 0.42 gpm per nozzle. In some example systems and methods, the high pressure, low flow spray involves a flow between 0.20 gpm and 0.28 gpm per nozzle. In some example systems and methods, the high pressure, low flow spray comprises a pressure between 40 pounds per square inch (PSI) and 80 PSI per nozzle.

Figure 1B:
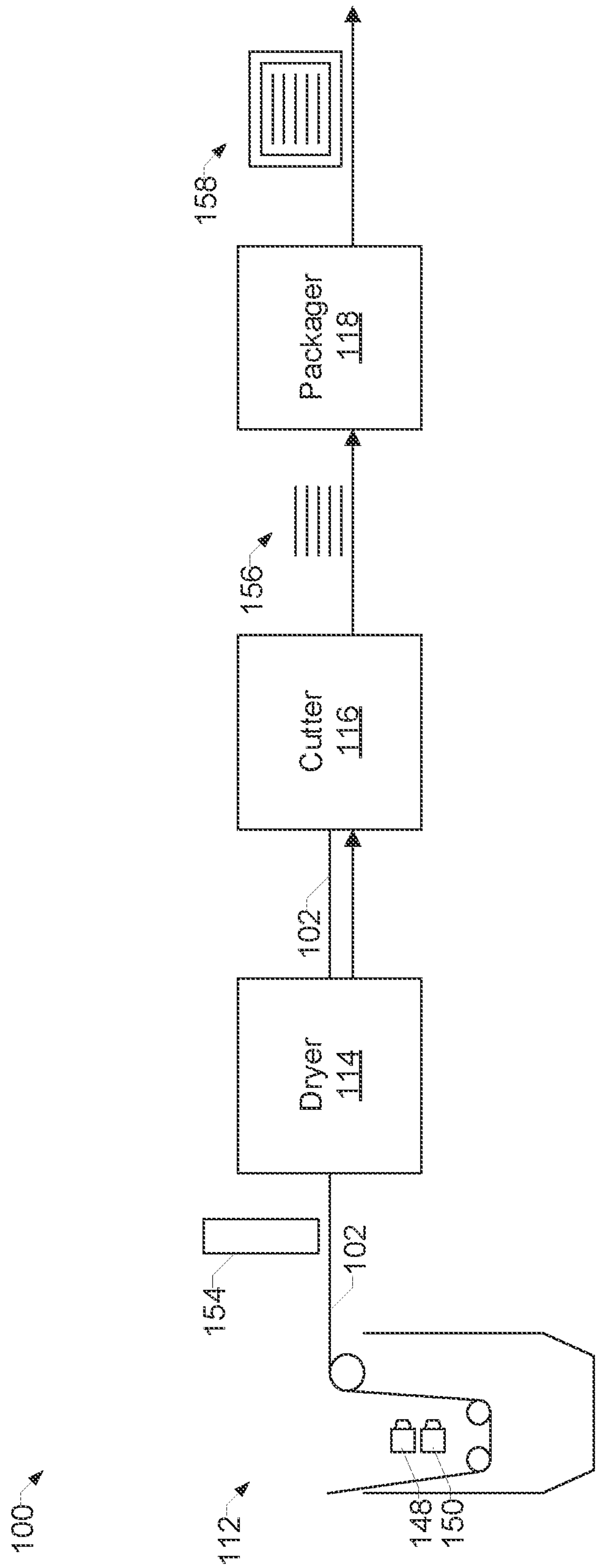

FIGS. 1A and 1B are a schematic diagram of an example system 100 to clean a continuous substrate 102. The example system 100 receives a supply of the continuous substrate 102 (e.g., a roll or other source of feedstock), cleans the continuous substrate 102, and dries the continuous substrate 102. In the illustrated example, the system 100 further cuts and packages the continuous substrate 102 in line with the cleaning and drying. In some examples, the substrate 102 is between 6 inches and 12 inches wide. However, other widths may be used.

The example substrate 102 may be a knit polyester material, such as polyethylene terephthalate (PET), polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, etc.

Additionally or alternatively, other synthetic materials may be used, such as polyamide, polyacrylonitrile, polyparaphenylene-terephthalamide, polyamides (e.g., Nylon 6, Nylon 6/6, Nylon 12, polyaspartic acid, polyglutamic acid, etc.), polyamines, polyimides, polyacrylics (e.g., polyacrylamide, polyacrylonitrile, esters of methacrylic acid and acrylic acid, etc.), polycarbonates (e.g., polybisphenol), polydienes (e.g., polybutadiene, polyisoprene, polynorbornene, etc.), polyepoxides, polyethers (e.g., polyethylene glycol (polyethylene oxide), polybutylene glycol, polypropylene oxide, polyoxymethylene (paraformaldehyde), polytetramethylene ether (polytetrahydrofuran), polyepichlorohydrin, etc.), polyolefins (e.g., polyethylene, polypropylene, polybutylene, polybutene, polyoctene, etc.), polyphenylenes (e.g., polyphenylene oxide, polyphenylene sulfide, polyphenylene ether sulfone, etc.), silicon containing polymers (e.g., polydimethyl siloxane, polycarbomethyl silane, etc.), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pryrrolidone, polymethyl vinyl ether, polyethyl vinyl ether, polyvinyl methyl ketone, etc.), polyacetals, and polyarylates.

In some example, a blend of polyester and/or cellulosic materials may be used. A blend of woven and/or nonwoven synthetic materials may also be used.

As illustrated in FIG. 1A, the example system 100 includes a first rinse section 104, a second rinse section 106, a washing section 108, an agitation bath section 110, and a final rinse section 112. As shown in FIG. 1B, following the final rinse section 112, the continuous substrate travels through a dryer 114, a cutter 116, and a packager 118.

The first rinse section 104 and the second rinse section 106 provide initial rinsing to the feedstock using rinse nozzles 120, 122. In the example of FIG. 1A, the rinse nozzle 120 in the first rinse section 104 sprays cold deionized water as a rinsing fluid, the rinse nozzle 122 in the second rinse section 106 sprays warm or hot deionized water as a rinsing fluid. In some examples, one or both of the first rinse section 104 or the second rise section 106 includes a surfactant with the deionized water as the cleaning fluid. The first rinse section 104 and the second rinse section 106 may be used to rinse larger particulate matter from the continuous substrate 102 to reduce the load on the washing section 108 and the agitation bath section 110. In some other examples, the first rinse section 104 and/or the second rinse section 106 are omitted from the system.

The example rinse nozzles 120, 122 may provide high pressure and/or low flow rinsing to the substrate 102. In other examples, rinsing may be at different temperature(s), may have a lower pressure, and/or may be performed at a different angular orientation, relative to the substrate 102, than the washing section 108 and/or the agitation bath section 110.

The example washing section 108 includes sets of high pressure, low flow nozzles 126, 128 to spray deionized water (or other cleaning fluid) at both sides of the continuous substrate 102. The substrate 102 is routed through the washing section 108 via a set of rollers 130. The rollers 130 and the sets of nozzles 126, 128 are arranged such that one set of nozzles 126 sprays a first side of the substrate 102 and the other set of nozzles 128 sprays a second side of the substrate 102. While an example arrangement is illustrated in FIG. 1A, any other arrangement of the nozzles 126, 128 and the rollers 130 may be used. The example nozzles 126, 128 may be stationary or adjustable (e.g., capable of rotation, translation, etc.).

In the example of FIG. 1A, the high-pressure, low flow nozzles 126, 128 displaces portions of the continuous substrate 102 at multiple locations in the transverse direction (e.g., perpendicular to the direction of travel of the substrate 102 at the point of displacement). The example nozzles 126, 128 may separate, or space apart, the spray streams across the width of the substrate 102 so as to create a wave shape in the substrate 102. By inducing the wave shape in the substrate 102, the fluid sprayed by the nozzles 126, 128 is directed away from the substrate 102 and reduces re-deposits of particulate matter that are loosened by the high pressure, low flow sprays.

The example nozzles 126, 128 spray the substrate 102 at multiple locations along a travel path of the substrate 102. In the example of FIG. 1A, the spray locations along the travel path are separated by the rollers 130, which define the travel path of the substrate 102 within the washing section 108. Other rollers 130 similarly define the travel path of the substrate 102 in the other sections 104, 106, 110, 112.

Figure 3:
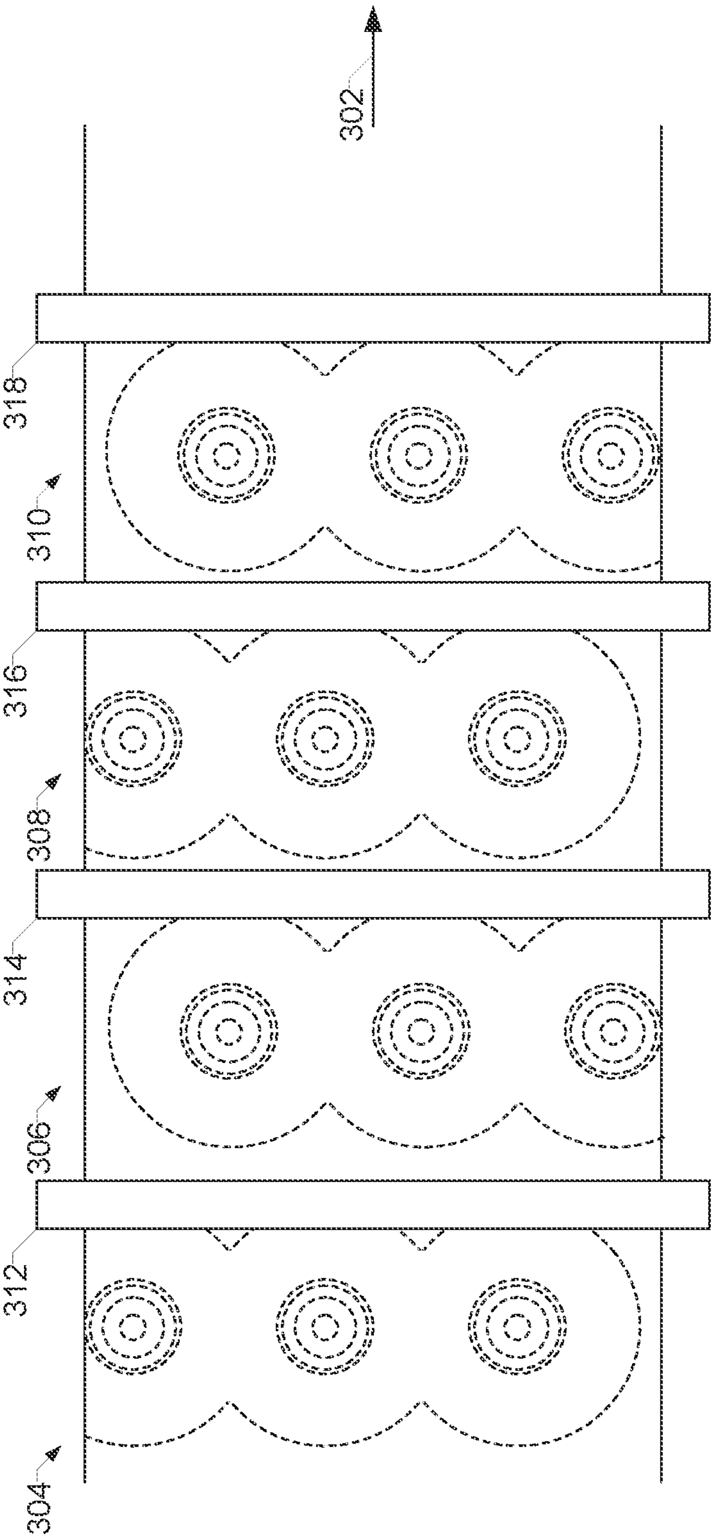
FIG. 3 illustrates an example displacement of a continuous substrate by the high pressure, low flow spray of FIGS. 1A and/or 2.

In the example of FIG. 1A, the nozzles 126, 128 spray different locations, in a transverse direction of the substrate 102, at different positions along the travel path of the substrate 102. FIG. 3, which is discussed in more detail below, illustrates an example of different locations in the transverse direction are sprayed at sequential positions along the length of the substrate 102 at a given time.

By spraying different locations in the transverse direction on each side of the substrate 102, the high pressure, low flow sprays provided by the nozzles 126, 128 efficiently remove and rinse away smaller particulates from the substrate 102 while the continuous substrate 102 travels through the washing section 108.

The example agitation bath section 110 is divided into a bath section 132 and a drain section 134, which are separated by a Weir wall 136 or other barrier. The bath section includes an agitator 138 to further wash the continuous substrate 102. In the example of FIG. 1A, the agitator 138 is a megasonic emitter. The megasonic emitter emits acoustic energy at one or more frequencies between 800 kHz and 2.0 MHz. In some examples, the megasonic emitter emits acoustic energy at one or more frequencies between 800 kHz and 1.2 MHz, or between 900 kHz and 1.1 MHz. However, other agitators may be used, such as an ultrasonic emitter (e.g., frequencies between 20 kHz and 80 kHz, and/or between 20 kHz and 50 kHz). The example agitation bath 110 further includes a reflector 140 on an opposite side of the substrate 102 from the agitator 138 to reflect agitation energy (e.g., megasonic energy) back toward the substrate 102. The example Weir wall 136 may permit the bath fluid 142 to flow over the Weir wall 136 and/or around the Weir wall 136 (e.g., through a gap between the Weir wall 136 and a basin 141 of the agitation bath section 110).

Ions and/or remaining particulates that are loosened from the substrate 102 in the bath section 132 tend to be buoyant relative to the bath fluid 142. In the example of FIG. 1A, the bath fluid 142 is deionized water. The agitation bath section 110 includes high pressure, low flow nozzles 144, 146. The nozzles 144, 146 may be similar or identical to the nozzles 126, 128 in the washing section 108, and may be used to provide additional washing of the substrate 102 prior to the agitation bath.

At least one of the nozzles 144, 146 in the agitation bath section 110 is directed into the bath fluid 142. The spray directed at the bath fluid 142 replenishes the bath fluid 142 and generates turbulence in the bath fluid 142. As a result, particulates and/or ions that float in the bath fluid 142 are carried over and/or around the Weir wall 136 to the drain section 134. The drain section 134 drains the fluid. In some examples, the drained fluid may be recycled back to the system 100.

The final rinse section 112 includes nozzles 148, 150 to provide a final rinse of cleaning fluid to the substrate 102 prior to drying, cutting, and/or packaging. The final rinse section 112 may remove any particulates and/or ions that have been loosened but not removed from the substrate 102 in the prior sections 104-110, and/or that have been removed and re-adhered to the substrate 102 during travel through the agitation bath section 110. The example nozzles 148, 150 may provide a lower spray pressure than the nozzles 126, 128, 144, 146.

The example sections 104-112 of FIG. 1A are contained within separate basins configured to contain and/or recover the cleaning fluid, and/or to reduce or prevent splashing between sections 104-112. The example system 100 includes rollers 152 between the sections 104-112 configured to guide the substrate 102, provide intermediate force to advance the substrate 102, and/or to define the travel path of the substrate 102. In some examples, the rollers 152 are driven by motors to pull the substrate 102 from section to section, which reduces stress on the substrate 102 compared to pulling the substrate 102 from a single location at the end of the section 112.

Additionally or alternatively, the system 100 may include vacuum nozzles 154 configured to remove moisture and/or particulate matter from the substrate 102 after one or more of the sections 104-112. In the example of FIG. 1A, vacuum nozzles 154 are positioned adjacent the substrate travel path at the end of (or following) each section 104-112, and vacuum moisture and/or particulates from the substrate 102.

Turning to FIG. 1B, following the final rinsing section 112, the continuous substrate 102 is fed to the dryer 114, which dries the substrate 102 using filtered and heated air. A vacuum nozzle 154 may be positioned adjacent the substrate prior to the dryer 114 to remove moisture and/or particulates from the substrate 102, thereby reducing the load on the dryer 114.

The example cutter 116 cuts the continuous substrate 102 into individual sections 156 of the substrate 102, such as individual wipers. In some examples, the cutter 116 may also stack or otherwise arrange multiple sections 156 of the substrate 102 into groups for packaging. The packager 118 packages the sections 156 produced by the cutter 116 into a package, such as a package 158 containing a predetermined count of wipers.

In some other examples, the dryer 114, the cutter 116, and/or the packager 118 may be omitted from the system 100, and the washed continuous substrate and/or individual sections of the substrate may be moved to a separate area for drying, cutting, and/or packaging.

The example system 100 of FIGS. 1A and 1B cleans the substrate 102 such that, at the output of the dryer 114, the cutter 116, and/or the packager 118, the cleaned substrate 102 (e.g., each wiper) preferably has between about $0.5\times10^6$ and $5.0\times10^6$ particles and/or fibers per square meter that are between about 0.5 and 5.0 μm, between about 30,000 and 70,000 particles and/or fibers per square meter that are between about 5.0 and 100 μm in length, and/or less than 150 fibers per square meter that are greater than 100 μm.

In some examples, the cleaned substrate 102 has less than about 0.06 ppm potassium, less than about 0.05 ppm chloride, less than about 0.05 ppm magnesium, less than about 0.20 ppm calcium, less than about 0.30 ppm sodium, and/or less than about 0.20 ppm sulfate. Additionally or alternatively, the cleaned substrate 102 (e.g., each wiper produced from the substrate 102) has about 0.02 $g/m^2$ isopropyl alcohol extractant, and about 0.01 $g/m^2$ deionized water extractant. Additionally or alternatively, the cleaned substrate 102 (e.g., each wiper produced from the substrate 102) has a water absorbency of between about 300 $mL/m^2$ to 650 $mL/m^2$. In some examples, the cleaned substrate 102 has a water absorbency of approximately 450 $mL/m^2$.

Figure 2:
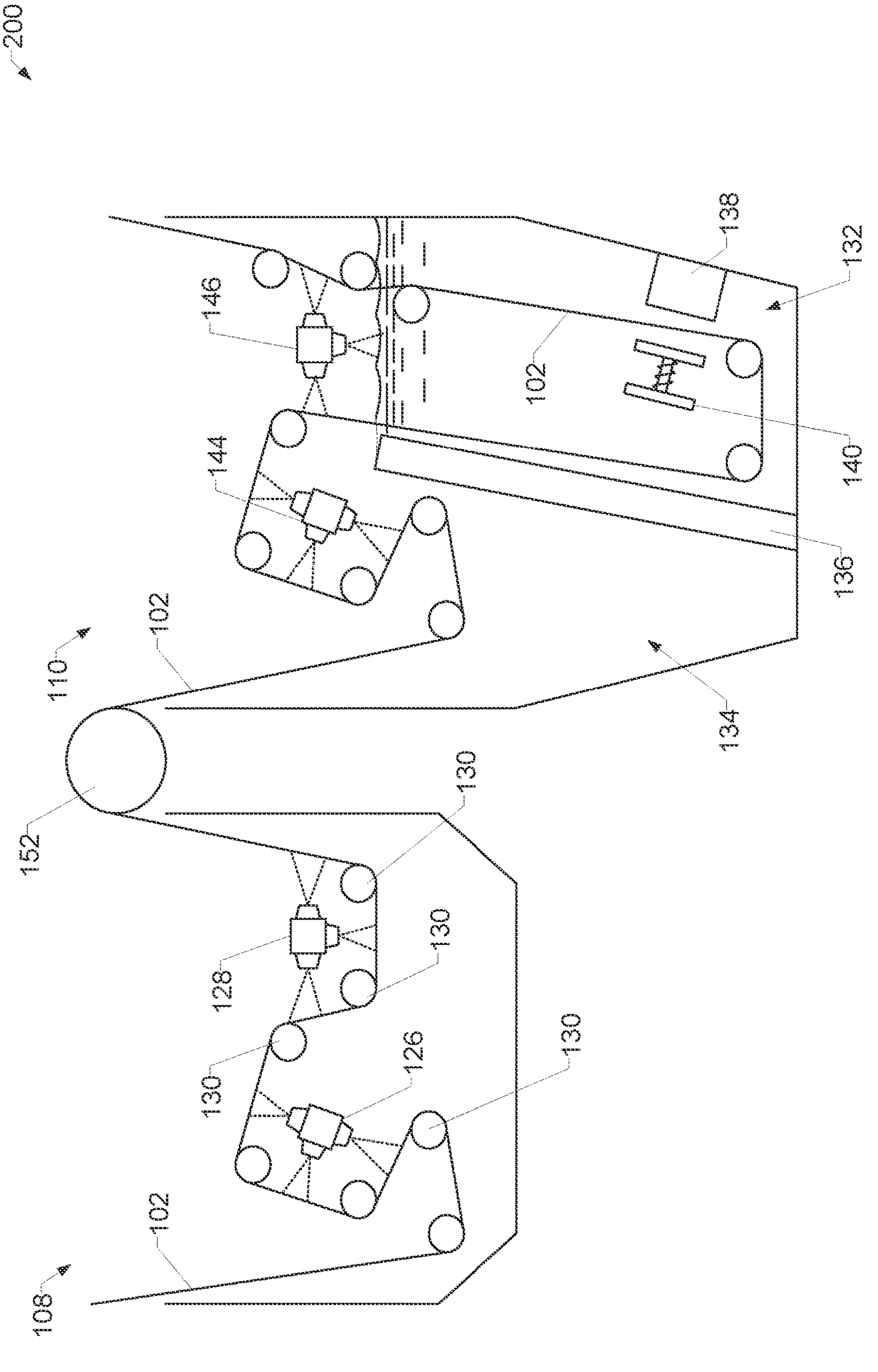
FIG. 2 is a schematic diagram of an example system to clean a continuous substrate including a high pressure, low flow spray of a cleaning fluid, and an agitation bath, in accordance with aspects of this disclosure.

FIG. 2 is a schematic diagram of another example system 200 to clean a continuous substrate (e.g., the continuous substrate 102) including a high pressure, low flow spray of a cleaning fluid, and an agitation bath. The example system 200 of FIG. 2 includes the washing section 110 and the agitation bath section 112 of FIG. 1A, and omits the other sections 104, 106, 112. Compared to the example system 100 of FIGS. 1A and 1B, the system 200 may experience an increased load for a given feedstock and/or may provide a higher throughput (e.g., feet per minute of the continuous substrate 102).

FIG. 3 illustrates an example displacement of the continuous substrate 102 by the high pressure, low flow spray of FIGS. 1A and/or 2. While the travel path of the substrate 102 is not straight, the example travel path 302 of the substrate 102 is flattened in the illustration of FIG. 3 to show the width of the substrate 102 at multiple points along the travel path.

The example substrate 102 travels over multiple sections 304, 306, 308, 310 at a given time, and the sections 304-310 are separated by respective rollers 312, 314, 316, 318 (or guides). The rollers 312-318 may include features to guide the substrate 102 and/or reduce or prevent lateral movement of the substrate 102.

The displacement of the substrate 102 is illustrated in FIG. 3 by way of contour lines, which are shown in broken line form. As shown in the example, there is a higher displacement at the center points of the high pressure, low flow sprays than between the center points, which results in a wave shape across the width of the substrate 102.

In some examples, the displacement occurs in a first direction for one or more of the sections 304-310 (e.g., by spraying the substrate 102 from a first side) and the displacement occurs in the opposite direction for others of the sections 304-310 (e.g., by spraying the substrate 102 from the other side).

Figure 4:
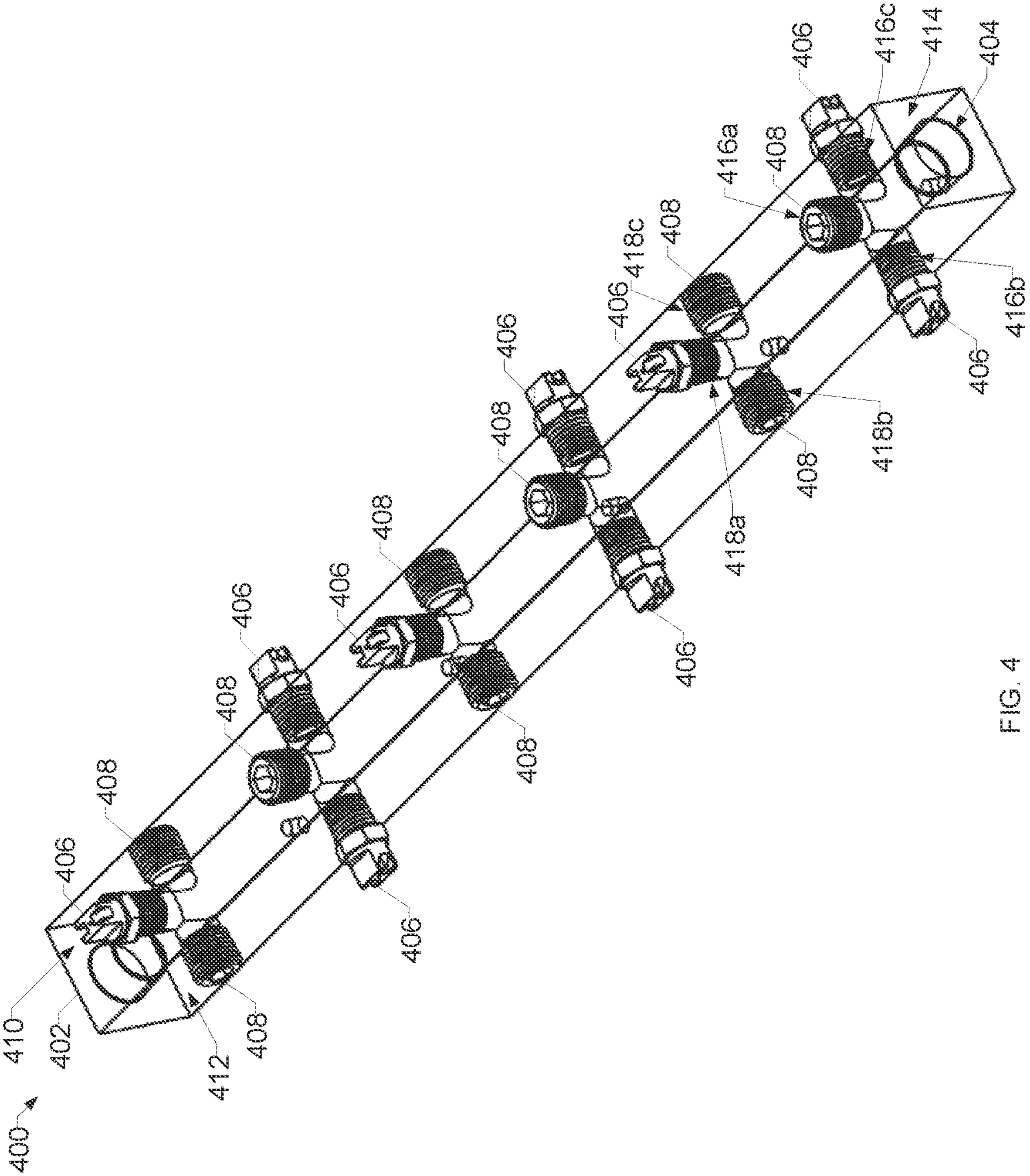
FIG. 4 is a perspective view of an example high pressure, low flow nozzle assembly that may be used to implement the nozzles of FIGS. 1A and/or 2.

FIG. 4 is a perspective view of an example high pressure, low flow nozzle assembly 400 that may be used to implement the nozzles 126, 128, 144, 146 of FIGS. 1A and/or 2. The example nozzle assembly 400 includes a manifold 402 that receives cleaning fluid (e.g., via an inlet 404 in the manifold) and includes a set of outlets on multiple sides of the manifold. The example manifold has a square cross-section, but may have other cross-section shapes.

The outlets in the example manifold 402 are coupled to high pressure, low flow nozzles 406 or to plugs 408. In the example of FIG. 4, on a given side of the manifold 402, the outlets are coupled to nozzles 406 and plugs 408 in an alternating pattern (e.g., nozzles 406 are not adjacent other nozzles 406, plugs 408 are not adjacent other plugs 408, etc.). Thus, each side of the manifold 402 may create a pattern of displacement in the substrate 102, such as the patterns illustrated in FIG. 3.

In addition to having an alternating nozzle pattern on a given side of the manifold 402, adjacent sides (e.g., a first side 410 and a second side 412, the first side and a third side 414, etc.) may also have an alternating pattern for corresponding outlet positions. The alternating pattern between adjacent sides provides alternating wave patterns to create displacement on different portions of the substrate 102 in the transverse direction. For example, the first outlet 416*a* on the first side 410 is coupled to a plug 408, while the outlets 416*b*, 416*c* at the same lengthwise position on the sides 412, 414 adjacent the first side 410 are coupled to nozzles 406. Conversely, the next outlet 418*a* on the first side 410 is coupled to a nozzle 406, while the outlets 418*b*, 418*c* at the same lengthwise position on the sides 412, 414 adjacent the first side 410 are coupled to plugs 408.

The example nozzles 406 provide a high pressure, low flow spray of cleaning fluid. In the example of FIGS. 1A, 1B, 2, 3, and 4, each of the example nozzles 406 are provided with a pressure between 40 pounds per square inch (PSI) and 80 PSI of pressure, and each of the nozzles 406 outputs a flow between 0.15 gallons per minute (gpm) and 0.42 gpm. In some such examples, each of the nozzles 406 outputs a flow between 0.20 gallons per minute (gpm) and 0.28 gpm.

Figure 5:
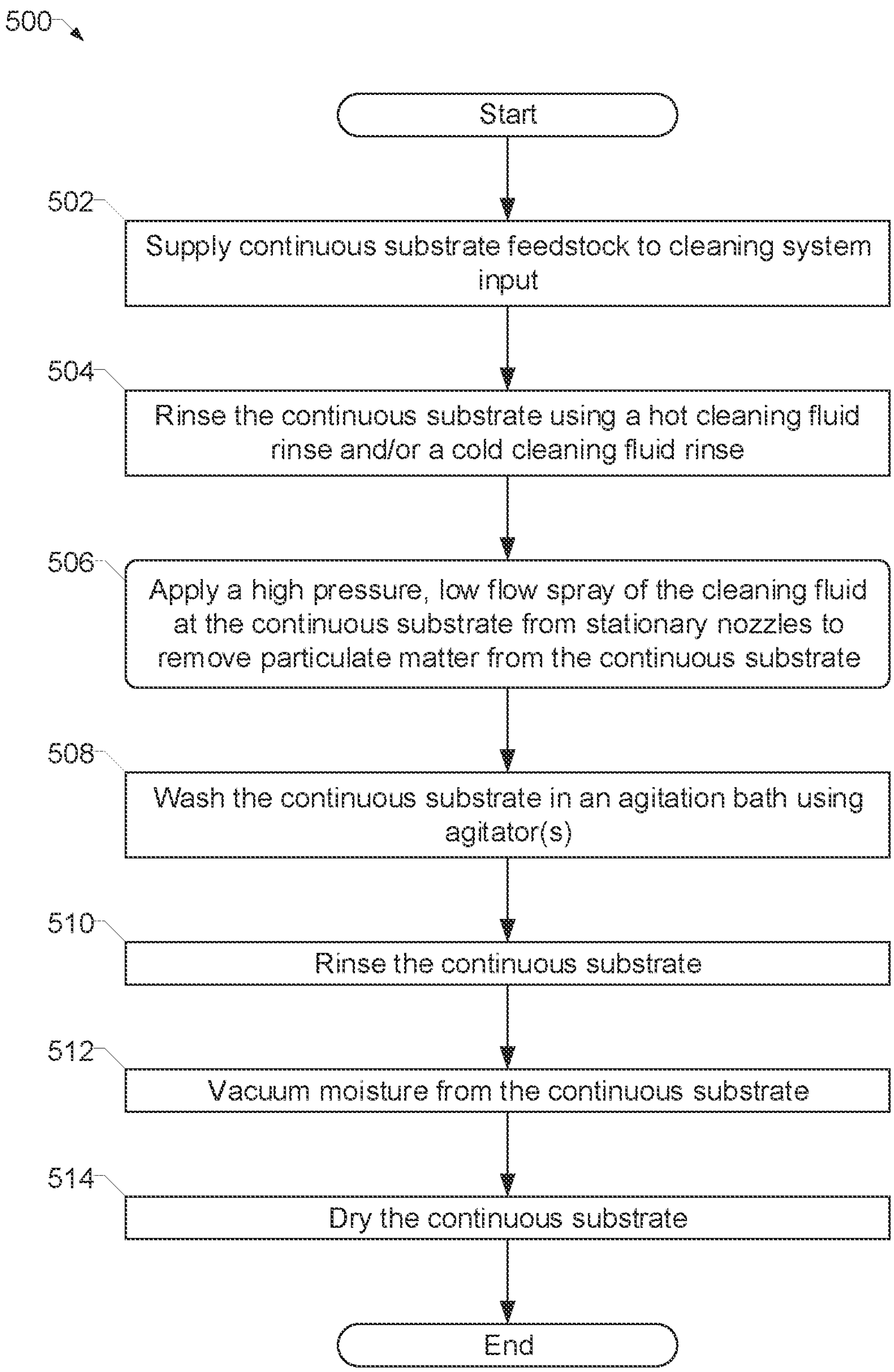
FIG. 5 is a flowchart representative of an example method that may be performed to clean a continuous substrate, in accordance with aspects of this disclosure.

FIG. 5 is a flowchart representative of an example method 500 that may be performed to clean a continuous substrate. The example method 500 may be implemented by the example system 100 of FIGS. 1A and 1B.

At block 502, a feedstock of the continuous substrate 102 is supplied to an input of the cleaning system 100. For example, a roll of the continuous substrate 102 may be loaded onto a spindle or other support structure, for feeding into the system 100.

At block 504, the rinsing sections 104, 106 rinse the continuous substrate 102 using a hot cleaning fluid rinse and/or a cold cleaning fluid rinse. The rinsing may be performed using high pressure and/or low pressure sprays of the cleaning fluid. In some examples, the cleaning fluid is deionized water. However, in some other examples, surfactant(s) and/or other cleaning agents may be included in the cleaning fluid with the deionized water.

At block 506, the washing section 108 (e.g., via stationary nozzles 126, 128, the nozzles 406 of FIG. 4) applies high pressure, low flow sprays of the cleaning fluid at the continuous substrate 102 from the nozzles (e.g., the nozzles 126, 128, the nozzles 406 of FIG. 4), to remove particulate matter from the substrate 102. For example, the washing section 108 may spray a first side of the continuous substrate 102 with the high pressure, low flow spray via first nozzles 126 and spray a second side of the continuous substrate 102 with the high pressure, low flow spray via second nozzles 128, while the continuous substrate 102 is routed through a travel path in the washing section 108. In some examples, the washing may also occur in the agitation bath section 110 with additional nozzles 144, 146.

The applying of the high pressure, low flow spray (e.g., via nozzles 126, 128, 144, 146) may involve displacing portions of the continuous substrate 102 at multiple locations in the transverse or lateral direction of the continuous substrate 102 (e.g., across the width of the substrate 102), to create a wave shape for directing the spray fluid and loosened particulates away from the substrate 102. As illustrated in FIG. 3, the high pressure, low flow sprays may displace the continuous substrate 102 at different transverse (e.g., lateral) locations at different positions along the length of the continuous substrate 102. The different positions along the length of the substrate 102 may be separated by guides or rollers (e.g., the rollers 130, 312-318).

At block 508, the agitation bath section 110 washes the continuous substrate 102 in an agitation bath using one or more agitators (e.g., the megasonic emitter 138, the reflector 140). In some examples, washing the continuous substrate 102 in the agitation bath includes transporting the continuous substrate 102 into the agitation bath, adjacent the agitator(s), and out of the agitation bath, to reduce or prevent reattachment of any loosened particulates and/or ions back onto the substrate 102.

At block 510, the final rinse section 112 rinses the continuous substrate 102. At block 512, the vacuum nozzle(s) 154 vacuums moisture from the continuous substrate 102. Additionally or alternatively, the vacuuming may be performed after each of the example blocks 504-510. At block 514, the example dryer 114 dries the continuous substrate 102. For example, the dryer 114 may blow heated and filtered air at and/or around the substrate 102 to dry the substrate 102. In some examples, the method 500 may further include cutting and/or packaging the continuous substrate 102 in line with blocks 502-514.

The example method 500 then ends. The example method 500 is described above with reference to a given section of the substrate 102. Because the continuous substrate 102 is moved through the system 100 continuously, blocks 504-514 may be performed continuously and simultaneously, on different sections of the continuous substrate 102.

Figure 6:
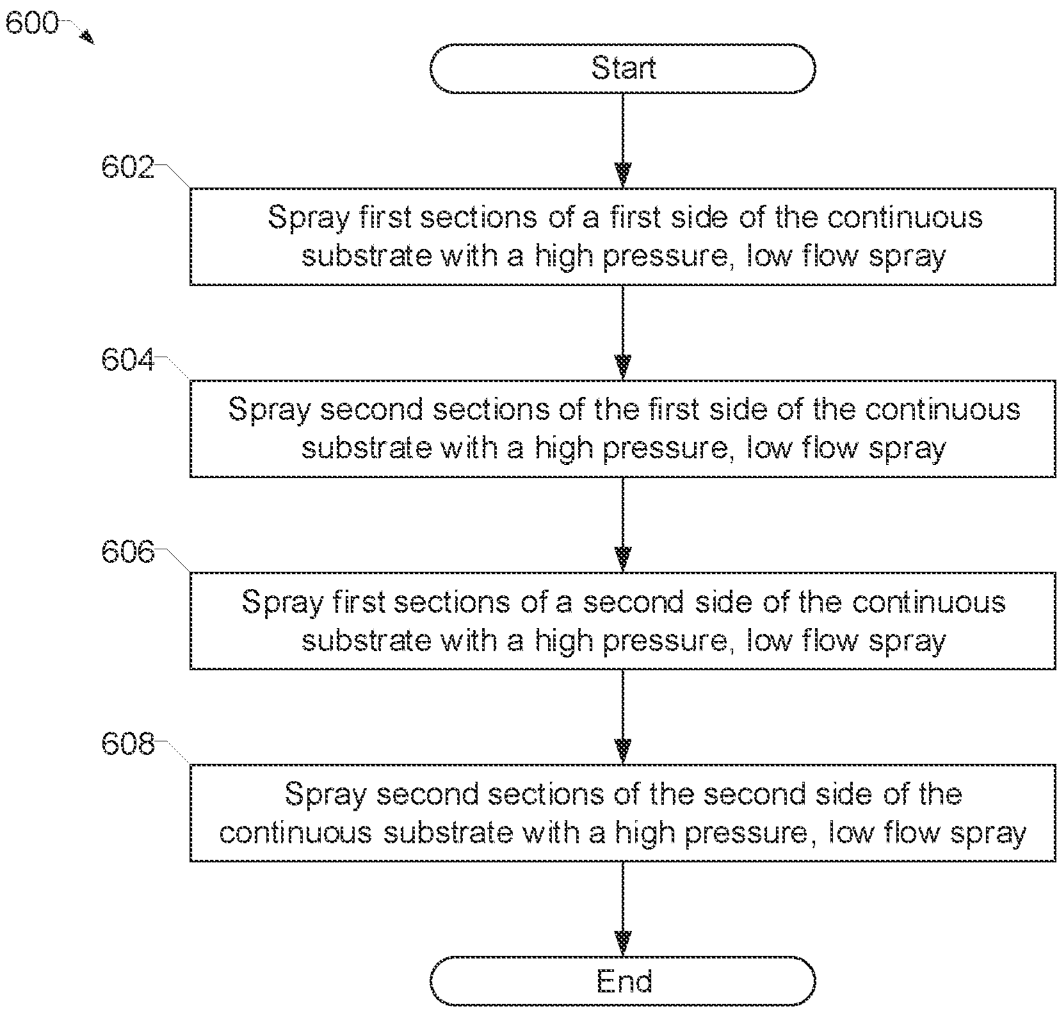
FIG. 6 is a flowchart representative of an example method that may be performed to wash a continuous substrate using a high pressure, low flow spray of cleaning fluid, in accordance with aspects of this disclosure.

FIG. 6 is a flowchart representative of an example method 600 that may be performed to wash a continuous substrate using a high pressure, low flow spray of cleaning fluid. The example method 600 may be used by the washing section 108 of FIGS. 1A and/or 2 to implement block 506 of FIG. 5, and/or any other blocks that involve high pressure, low flow spraying of cleaning fluid.

At block 602, the example nozzles 126 (e.g., via the nozzles 406 on the side 414 of the nozzle assembly 400 of FIG. 4) spray first sections of a first side of the continuous substrate 102 with a high pressure, low flow spray. For example, the nozzles 126 may spray spaced portions across the width of the first section 304 of the substrate 102 using the nozzles 406). In some examples, the nozzles 126 do not spray (or do not spray enough to create meaningful displacement) portions of the first section 304 between the sprayed sections. In other words, the nozzles 126 may alternate areas across the width of the substrate 102 that are displaced with areas that are not displaced.

At block 604, the nozzles 126 (e.g., via the nozzles 406 on the side 410 of the nozzle assembly 400 of FIG. 4) spray second sections of the first side of the continuous substrate 102 with a high pressure, low flow spray. For example, the nozzles 126 may spray spaced portions across the width of the second section 306 of the substrate 102 using the nozzles 406). In some examples, the sprayed or displaced portions are different across the width of the substrate 102 than the sprayed or displaced portions of block 602 (e.g., in section 304)

At block 606, the nozzles 128 (e.g., via the nozzles 406 on the side 414 of the nozzle assembly 400 of FIG. 4) spray first sections of a first side of the continuous substrate 102 with a high pressure, low flow spray. For example, the nozzles 128 may spray spaced portions across the width of the third section 308 of the substrate 102 using the nozzles 406). In some examples, the nozzles 128 do not spray (or do not spray enough to create meaningful displacement) portions of the third section 308 between the sprayed sections. In other words, the nozzles 128 may alternate areas across the width of the substrate 102 that are displaced with areas that are not displaced.

At block 608, the nozzles 128 (e.g., via the nozzles 406 on the side 410 of the nozzle assembly 400 of FIG. 4) spray second sections of the second side of the continuous substrate 102 with a high pressure, low flow spray. For example, the nozzles 128 may spray spaced portions across the width of the fourth section 310 of the substrate 102 using the nozzles 406). In some examples, the sprayed or displaced portions are different across the width of the substrate 102 than the sprayed or displaced portions of block 606 (e.g., in section 306).

Additional sections of one or both sides of the substrate 102 may be sprayed using the high pressure, low flow spray. The example method 600 is described above with reference to a given section of the substrate 102. Because the continuous substrate 102 is moved through the system 100 continuously, blocks 602-608 may be performed continuously and simultaneously, on different sections of the continuous substrate 102.

The present methods and systems may be controlled using hardware, software, and/or a combination of hardware and software. The present methods and/or systems may be controlled in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A system to clean a continuous substrate, the system comprising:

one or more high pressure nozzles configured to spray a high pressure, low flow spray of a first cleaning fluid at the continuous substrate to remove particulate matter from the continuous substrate;

an agitation bath and a plurality of rollers configured to transport the continuous substrate from a first volume having the high pressure, low volume spray, to a second volume having the agitation bath;

an agitator in the agitation bath, comprising at least one of a megasonic transducer or an ultrasonic transducer, and configured to direct energy at the continuous substrate;

a vacuum roller configured to vacuum moisture from the continuous substrate during transporting of the continuous substrate from the first volume to the second volume; and a dryer configured to dry the continuous substrate.

2. The system as defined in claim 1, further comprising a reflector plate positioned on an opposite side of the continuous substrate from the agitator and configured to reflect the energy from the agitator toward the continuous substrate.

3. The system as defined in claim 1, wherein the one or more high pressure nozzles comprise:

one or more first high pressure nozzles configured to spray a first side of the continuous substrate with the high pressure, low flow spray; and one or more second high pressure nozzles configured to spray a second side of the continuous substrate with the high pressure, low flow spray.

4. The system as defined in claim 1, wherein the one or more high pressure nozzles are configured to apply the high pressure, low flow spray by displacing portions of the continuous substrate at multiple locations in the transverse direction of the continuous substrate, to create a wave shape for directing the sprayed first cleaning fluid away from the continuous substrate.

5. The system as defined in claim 4, wherein the one or more high pressure nozzles are configured to apply the high pressure, low flow spray by displacing the continuous substrate at different transverse locations at different locations along the length of the continuous substrate.

6. The system as defined in claim 5, further comprising a roller positioned between the different locations along the length of the continuous substrate to route the continuous substrate to the different locations.

7. The system as defined in claim 1, wherein the continuous substrate is between 6 inches and 12 inches in width.

8. The system as defined in claim 1, wherein the first cleaning fluid comprises deionized water.

9. The system as defined in claim 1, wherein the continuous substrate is not submerged during the applying of the high pressure, low flow spray.

10. The system as defined in claim 1, further comprising one or more low pressure nozzles having a lower spray pressure than the one or more high pressure nozzles and configured to rinse the continuous substrate after applying the high pressure, low flow spray.

11. The system as defined in claim 1, wherein the agitation bath comprises a weir wall and a drain, and the agitation bath is configured to cycle the first cleaning fluid in the agitation bath via adding water to the agitation bath and permitting the first cleaning fluid to flow out of the agitation bath over a weir wall to a drain.

12. The system as defined in claim 11, wherein the agitation bath is configured to cycle the first cleaning fluid by conducting particulates toward the drain.

13. The system as defined in claim 1, further comprising one or more spray nozzles configured to spray the first cleaning fluid into the agitation bath to create surface turbulence in the agitation bath.

14. The system as defined in claim 1, further comprising one or more low pressure nozzles having a lower spray pressure than the one or more high pressure nozzles and configured to rinse the continuous substrate following the agitation bath.

15. The system as defined in claim 1, wherein the plurality of rollers are configured to transport the continuous substrate into the agitation bath, adjacent the agitator, and out of the agitation bath.

16. The system as defined in claim 1, further comprising one or more low pressure nozzles having a lower spray pressure than the one or more high pressure nozzles and configured to rinse the continuous substrate with a spray of a second cleaning fluid.

17. The system as defined in claim 16, wherein at least one of the first cleaning fluid or the second cleaning fluid comprises a surfactant.

18. The system as defined in claim 16, wherein the first cleaning fluid and the second cleaning fluid are the same.

* * * * *